(12) United States Patent
Shinagawa et al.

(10) Patent No.: US 7,880,669 B2
(45) Date of Patent: Feb. 1, 2011

(54) RADAR APPARATUS

(75) Inventors: Tokio Shinagawa, Hyogo (JP); Shinichi Shibata, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 130 days.

(21) Appl. No.: 11/610,348

(22) Filed: Dec. 13, 2006

(65) Prior Publication Data

US 2007/0132632 A1 Jun. 14, 2007

(30) Foreign Application Priority Data

Dec. 14, 2005 (JP) .............................. 2005-360714

(51) Int. Cl.
*G01S 13/00* (2006.01)
(52) U.S. Cl. .................. 342/147; 342/70; 342/113; 342/133; 342/139; 342/146
(58) Field of Classification Search .................. 342/70
See application file for complete search history.

(56) References Cited

U.S. PATENT DOCUMENTS

| 5,754,100 | A | * | 5/1998 | Park ........................ 340/435 |
| 6,246,357 | B1 | | 6/2001 | Uehara |
| 2003/0142007 | A1 | | 7/2003 | Ono et al. |
| 2004/0145513 | A1 | * | 7/2004 | Katayama et al. ............. 342/70 |
| 2004/0169840 | A1 | * | 9/2004 | Hoashi et al. ............. 356/4.01 |
| 2005/0174282 | A1 | * | 8/2005 | Nakanishi et al. ........... 342/109 |
| 2006/0109168 | A1 | * | 5/2006 | Nakanishi et al. ............. 342/70 |

FOREIGN PATENT DOCUMENTS

| EP | 1239298 | 9/2002 |
| EP | 1533627 | 5/2005 |
| JP | 11-52042 | 2/1999 |
| JP | 11-64500 | 3/1999 |
| JP | 11231053 | 8/1999 |
| JP | 2004037380 | 2/2004 |
| JP | 2004-101347 | 4/2004 |

OTHER PUBLICATIONS

Japan Patent Office, "Notification of Reasons For Rejection", Aug. 18, 2009, Published in: JP.

* cited by examiner

*Primary Examiner*—Thomas H Tarcza
*Assistant Examiner*—Timothy A Brainard
(74) *Attorney, Agent, or Firm*—Fogg & Powers LLC

(57) ABSTRACT

To provide a radar apparatus capable of rapidly detecting an object at the end of a detecting range. The present invention provides a radar apparatus comprising a radar sensor that transmits a transmitting wave to a predetermined angular range and receives a reflected wave reflected by an object and a processing unit that obtains a peak of strength from a distribution of strength for angle of the received reflected wave and determines the direction of the object based on the peak. The processing unit detects the reflected wave at the end of the angular range and, when the peak is not detected, determines whether the object exists in the direction of the end of the angular range, based on the distribution of strength of the detected reflected wave.

5 Claims, 12 Drawing Sheets

NUMBER OF DIRECTIONS IN WHICH REFLECTED WAVE IS OBSERVED

RADAR APPARATUS

CROSS-REFERENCE TO RELATED APPLICATIONS

This application is based upon and claims the benefit of priority from the prior Japanese Patent Application No. 2005-360714, filed on Dec. 14, 2005, the entire contents of which are incorporated herein by reference.

BACKGROUND OF THE INVENTION

1. Field of the Invention

The present invention relates to a radar apparatus that transmits an electromagnetic wave and detects an object with equal angular spaces, and more particularly, to a radar apparatus that is installed in a vehicle and detects an object.

2. Description of the Related Art

Proposal is made of a radar apparatus that is installed at the front of a vehicle and measures a distance to an object and a relative velocity of the vehicle to the object. By measuring the distance and the relative velocity to the object, an alarm device can be activated to forewarn against a collision with the object or a brake is activated to avoid the collision with the object.

Among conventional radar apparatuses is an apparatus that rotates at a predetermined frequency a movable radar sensor that transmits a beam of an electromagnetic wave of a millimeter wave range and reciprocates the sensor within a certain angular range. This apparatus detects the object by transmitting the beam to the object existing at a predetermined angle and a predetermined distance in front of the vehicle and by receiving the reflected wave. Such apparatus is disclosed in Patent Document 1 (Japanese Patent Application Laid-Open Publication No. 11-52042).

An average of the strength of the wave reflected by the object is calculated and output for each of equal angular spaces. The average of the strength of the reflected wave in each angular direction is compared with the averages of the strength at two adjoining angular directions and if the average of the strength in such angular direction is stronger than the averages of the strength in the two adjoining angular directions, then it is determined that such angular direction is the angular direction in which the object exists.

FIG. 1 is a diagram of detection of the object by the conventional radar apparatus. FIG. 2 is a diagram of details of angles in obtaining the average of the strength of the reflected wave at the equal angular spaces.

A radar apparatus 1 is installed at the front of a vehicle 2 and transmits the millimeter wave at the angle of +10° to −10° if a centerline of the vehicle is set at 0°. At this moment, the average of the strength of the reflected wave is obtained for the range of ±0.6° in the angular direction shown in FIG. 2.

For example, the average of the strength of the reflected wave at +6.6° in FIG. 2 is obtained by observing the reflected wave from +7.2° to +6.0°. Thereafter, the radar sensor rotates and the average of the strength of the reflected wave at +5.4° is obtained by observing the reflected wave from +6.0° to +4.8°.

FIG. 3 is a diagram of an example of strength of the reflected wave illustrating the angular direction in which the object reflecting the transmitted wave exists. The strength of the wave reflected by the object is obtained at the angles shown in FIG. 2. Thus obtained strength of the reflected wave in each angular direction is compared with the strength in two adjacent angular directions and if the strength in any angular direction is stronger than the strength in two adjacent angular directions, then it is judged that the object exists in such angular direction. In the case of FIG. 3, since the strength of the reflected wave at −2.4° is stronger than the strength of the reflected wave at −3.6° and −1.2°, it is judged that the object exists in the direction of −2.4°. If the strength of the reflected wave in any angular direction does not exceed a threshold in FIG. 3, then it is judged that nothing has been observed in such angular direction.

However, in such the radar apparatus, at the end of a predetermined angular range for detecting the object, comparison can not be made with the strength of the reflected wave in two adjacent angular directions.

Description will now be made of the case where comparison can not be made of the strength of the reflected wave in certain angular direction with the strength of the reflected wave in two adjacent angular directions.

FIG. 4 exemplifies the case where the object exists at the end of the object detecting range. FIG. 5 exemplifies the strength of the reflected wave obtained by the observation in FIG. 4.

In FIG. 4, the radar apparatus 1 installed in the vehicle 2 detects the object by transmitting the millimeter wave to the object detecting range 3 and receiving the reflected wave. At this moment, a vehicle 4 running ahead moves in the direction of an arrow X and enters the lane on which the vehicle 2 is running. A part of the vehicle 4 comes into the object detecting range 3.

At this moment, the strength of the reflected wave as observed by the radar apparatus 1 is as shown in FIG. 5. The radar apparatus 1 detects nothing from the left end of the object detecting range to the angular direction of +4.8°, since the strength of the reflected wave does not exceed the threshold in such a range. Then, by the observation at +6.0°, the radar apparatus 1 detects for the first time the reflected wave exceeding the threshold. Thereafter, the strength of the reflected wave continues to rise at +7.2° and at +8.4° and reaches its peak at +9.6°.

The conventional radar apparatus compares the strength of the reflected wave in each angular direction with the strength of the reflected wave in two adjacent angular directions, and if the strength is stronger in any angular direction than in two adjacent angular directions, then it determines that such direction is the direction in which the object exists. For this reason, the radar apparatus can not determine the position of the object in the example of FIGS. 4 and 5. The case that fits in with the example of FIGS. 4 and 5 is, for example, an intrusion by other vehicle into the lane on which a vehicle is running.

Detailed description will be made of the strength of the reflected wave in the situation of FIG. 4.

FIGS. 6A to 6C are diagrams of the strength of the reflected wave at the time of intrusion of the vehicle from an adjacent lane to the right. When the vehicle intrudes from the adjacent lane to the right as shown in FIG. 4, the reflected wave is observed only at the end of the detecting range 3 as shown in FIG. 6A. A solid line RL shown on the vehicle 4 running ahead indicates the strength of the reflected wave and a broken line BL indicates the strength of the reflected wave that would be observed if the reflected wave were within the detecting range 3.

In FIG. 6A, the reflected wave is observed only at the end of the detecting range 3. In the situation of FIG. 6A, the peak can not be definitely determined, and the conventional radar apparatus does not recognize the intruding vehicle. FIG. 6B shows the state in which, after a lapse of certain time from FIG. 6A, the vehicle has further intruded. Even in this diagram, the peak of the strength of the reflected wave can not be definitely determined, and the conventional apparatus does not recognize the intruding vehicle. FIG. 6C shows the state in which, after a lapse of certain time from FIG. 6B, the vehicle has further intruded. In this diagram, the strength of the reflected wave at the end of the detecting range is weaker than the strength of the reflected wave nearest at the inner side thereof, and the peak of the strength of the reflected wave can be confirmed.

As seen above, when the angular direction can not be determined although the reflected wave is detected, the processing associated with the detection of the object can not be executed. In particular, determination can not be made of the angular direction of the vehicle suddenly intruding into the lane on which the vehicle in question is running, at the very moment of the intrusion. As a result, it takes time until the object is detected and an appropriate processing can not be made or uneasiness is caused to a driver of the car. Furthermore, if the detection takes time, the car collides with the object, in particular, the intruding vehicle.

SUMMARY OF THE INVENTION

In view of the above, an object of the present invention is to provide a radar apparatus that can speedily detect an object at the end of a detecting range.

Another object of the present invention is to provide a radar apparatus that can speedily detect a vehicle intruding into a lane on which another vehicle is running.

A further object of the present invention is to provide a radar apparatus that is useful in avoiding a collision with a vehicle intruding into the lane on which another vehicle is running.

In order to solve the above problem, the present invention provides a radar apparatus having a radar sensor which transmits a transmitting wave to a predetermined angular range and receives a reflected wave reflected by an object; and a processing unit which obtains a peak of strength from a distribution of strength for angle of the received reflected wave and determines the direction of the object based on the peak, wherein the processing unit detects the reflected wave at the end of the angular range, and when the peak is not detected, determines whether the object exists in the direction of the end of the angular range, based on the distribution of strength of the detected reflected wave.

In a preferred embodiment of the present invention, when the distribution of strength of the detected reflected wave has a tendency of increasing toward the end to the angular range, the processing unit determines that the object is positioned in the direction rotated by a predetermined angle toward the end of the angular range, based on the angle at which the increasing tendency begins.

In another preferred embodiment of the present invention, the processing unit calculates the distance to the object, and when the calculated distance is within a predetermined range, makes the determination as to the existence of the object at the end of the angular range.

In a further preferred embodiment of the present invention, the processing unit makes the determination as to the existence of the object based on the distribution of strength of the detected reflected wave and a distribution of strength of a reflected wave of an average object.

The radar apparatus according to the present invention enables speedy detection of an object around the end of a detecting range by detecting a reflected wave at the end of an angular range and, when a peak can not be detected, by judging whether the object exists in the direction of the end according to a distribution of strength of thus detected reflected wave.

DESCRIPTION OF THE PREFERRED EMBODIMENTS

Description will then be made of embodiments of the present invention, with reference to drawings. It should be understood, however, that a technological scope of the present invention is not limited to these embodiments, but extends to cover matters described in the scope of claim and equivalents thereof.

Figure 7:
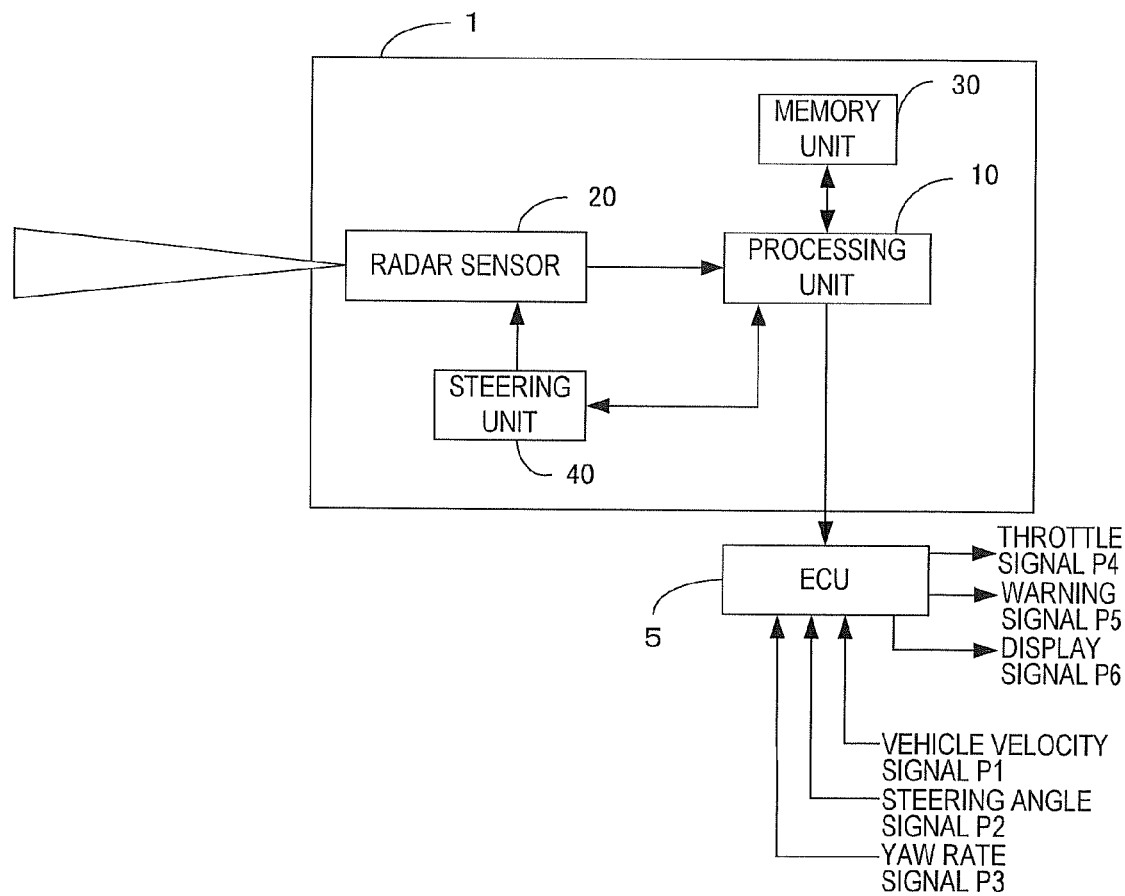
FIG. 7 is a block diagram of a radar apparatus according to embodiments of the present invention.

FIG. 7 is a block diagram of a radar apparatus according to embodiments of the present invention. The radar apparatus 1 according to the present embodiments is comprised of a processing unit 10, a radar sensor 20, a memory unit 30, and a steering unit 40. The radar apparatus 1 is connected to an ECU (Electric Control Unit) for control of a vehicle.

Figure 1:
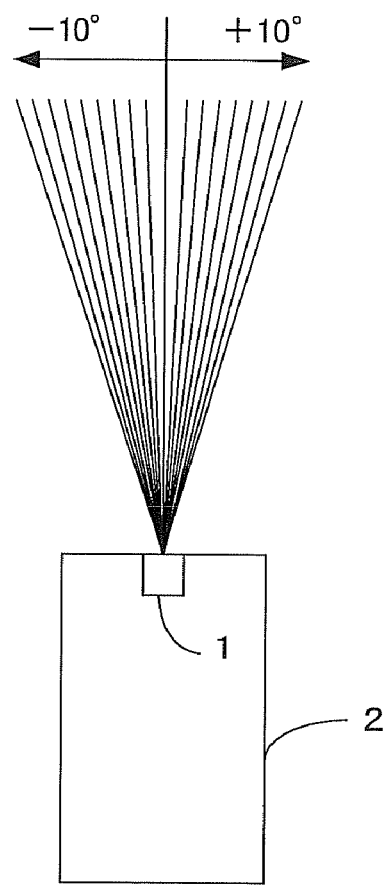
FIG. 1 is a diagram of detection of an object by the conventional radar apparatus.
Figure 2:
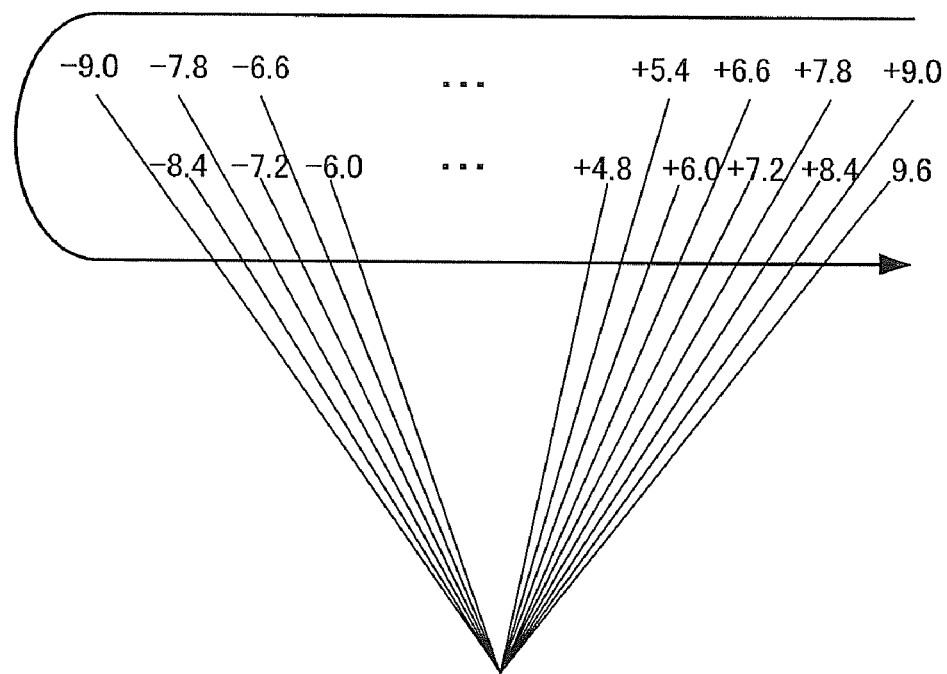
FIG. 2 is a diagram of details of angles in obtaining an average of strength of a reflected wave at equal angular spaces.
Figure 3:
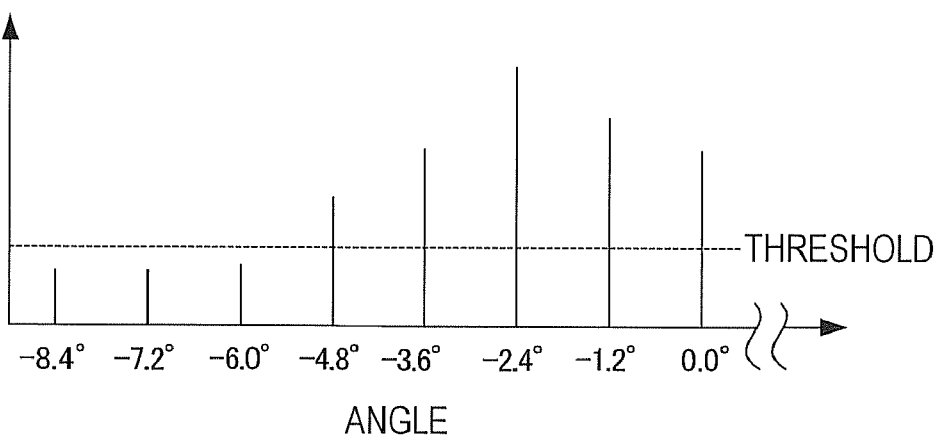
FIG. 3 is a diagram of an example of strength of a reflected wave illustrating the angular direction in which the object reflecting a transmitted wave exists.
Figure 4:
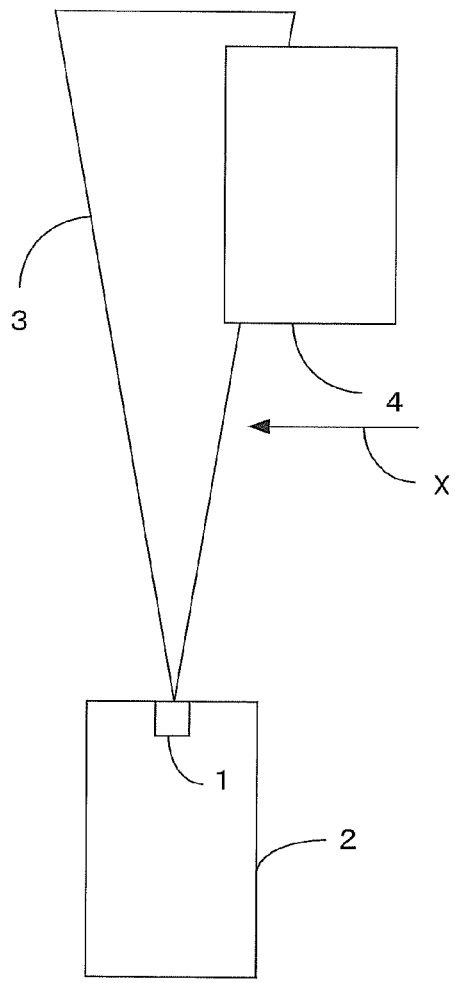
FIG. 4 exemplifies the case where an object exists at the end of an object detecting range.
Figure 5:
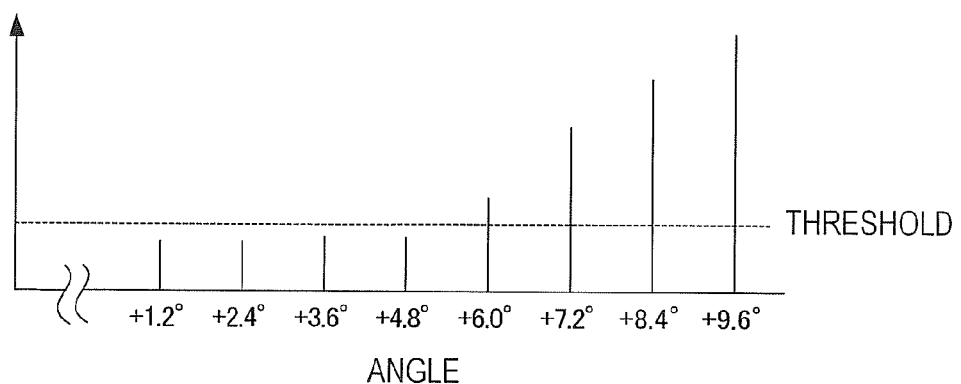
FIG. 5 exemplifies strength of a reflected wave obtained by the observation in FIG. 4.
Figure 6A:
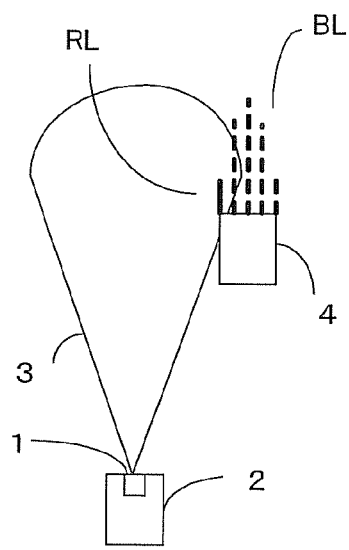
FIGS. 6A to 6C are diagrams of strength of a reflected wave at the time of intrusion of a vehicle from an adjacent lane to the right.
Figure 6B:
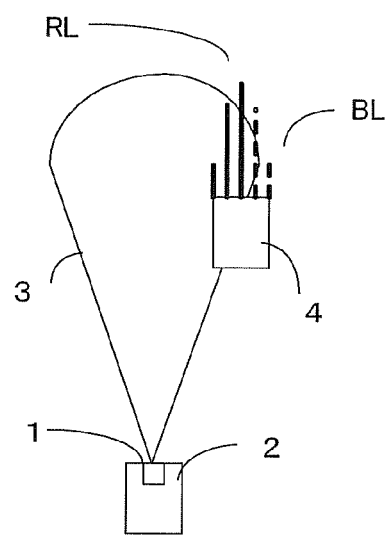
Figure 6C:
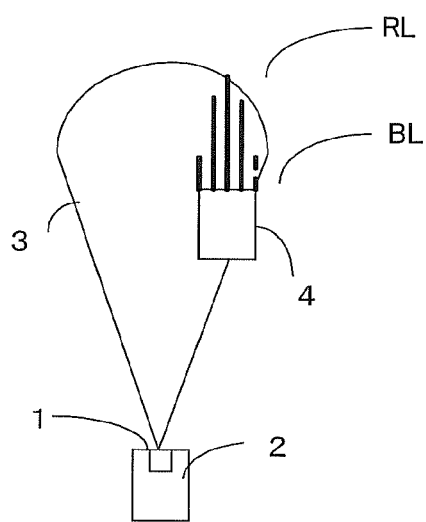

The steering unit 40 is comprised of a motor, etc., rotates the radar sensor 20 upon receipt of a signal from the processing unit 10 comprising, for example, a CPU. After rotation by about 10°, the steering unit 40 reversely rotates the radar sensor 20. After reverse rotation by about 20°, the radar sensor 20 has its rotating direction reversed again. Thereafter, reversing of direction for every about 20° is repeated. In this process, an average is obtained of the strength of the reflected wave over ±0.6° in the angular direction shown in FIG. 2. For example, the average of the strength of the reflected wave at +6.6° in FIG. 2 is obtained by observing the reflected wave form +7.2° to +6.0°. Thereafter, the radar sensor 20 rotates and the average of the strength of the reflected wave at +5.4° is obtained by observing the reflected wave form +6.0° to +4.8°.

The radar sensor 20 rotated by the steering unit 40 transmits an electromagnetic wave of millimeter wave range. A part of the transmitted millimeter wave is reflected by an object and is received by the same radar sensor 20. Here, if the wave to be transmitted has its frequency modulated, a distance to the object reflecting the transmitted wave can be obtained by comparing a difference in frequency of the transmitted wave and the received wave.

Figure 8:
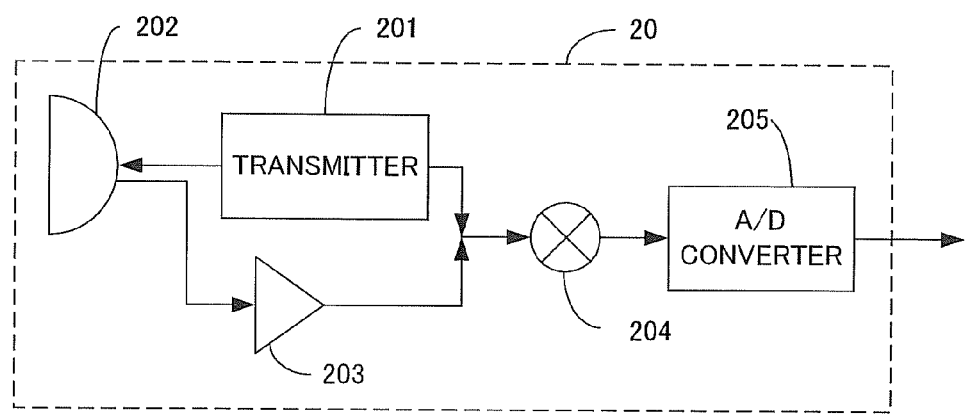
FIG. 8 is a block diagram of a radar sensor according to the present embodiments.

FIG. 8 is a block diagram of the radar sensor according to the present embodiments. If the detection of the object starts, a transmitter 201 starts to transmit the electromagnetic wave of the millimeter wave range by way of an antenna 202. The millimeter wave is an electromagnetic wave with a wavelength of 1 millimeter to 10 millimeter (frequency of 300 GHz to 30 GHz). The millimeter wave to be transmitted is frequency modulated for detection of a distance and a relative velocity.

The millimeter wave transmitted from the antenna 202 is reflected by a reflecting object positioned ahead, for example, a vehicle running ahead, a signpost, a guardrail, etc. The wave reflected by the reflecting object is received by the same antenna 202 and is amplified by an amplifier 203.

Amplified signal is mixed with an output of the transmitter 201 at the time of transmission by a mixer 204. Mixed signal is converted to a digital signal by an analog to digital converter 205 and is output from the radar sensor 20. Mixing by the mixer 204 is carried out for obtaining the distance to the reflecting object or obtaining a velocity difference with the reflecting object.

Figure 9:
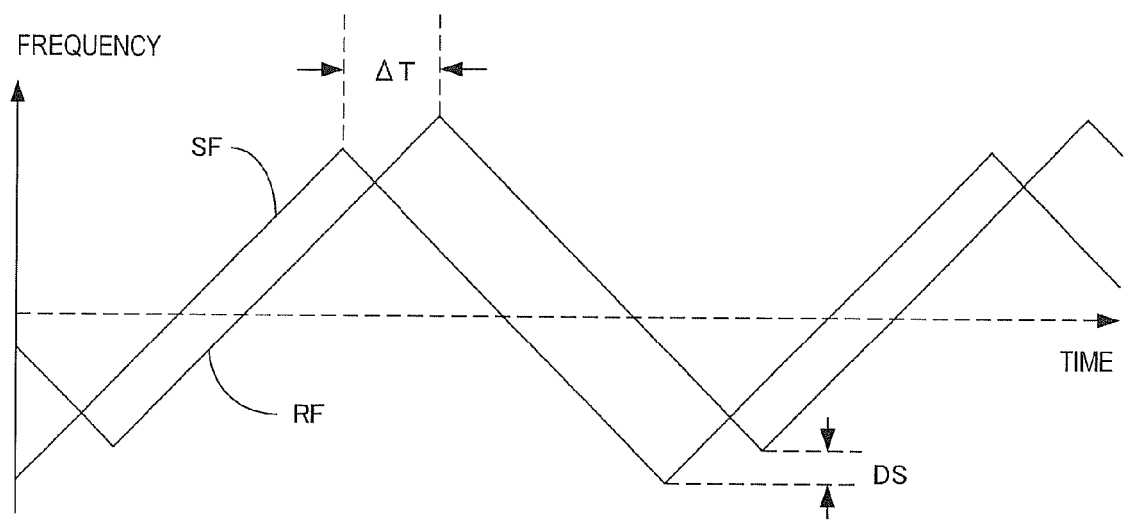
FIG. 9 is a diagram of frequencies of a transmitted wave and a received wave.

FIG. 9 is a diagram of frequencies of the transmitted wave and the received wave. A transmitting frequency SF rises at a constant rate over a certain time and then falls at the same constant rate and returns to an original frequency. This is repeated by the transmitting frequency. A received frequency RF obtained by the reflection of the transmitted wave by the object delays by a time difference ΔT as compared with the transmitting frequency. The received frequency is subject to a Doppler displacement DS based on the relative velocity of the reflecting object.

Mixed signal is output from the radar sensor 20 and input to the processing unit 10. The processing unit 10, based on the signal from the radar sensor 20, obtains the time difference between the transmitted wave and the received wave and the Doppler displacement caused at the time of reflection. From thus obtained time difference between the transmitted wave and the received wave and Doppler displacement caused at the time of reflection, the processing unit 10 obtains the distance to the reflecting object and the relative velocity with the reflecting object. The processing unit 10 also obtains the strength of the reflected wave based on the signal provided by the radar sensor 20.

The information such as the distance, the relative velocity and the strength of the reflected wave obtained by the processing unit 10 is stored at the memory unit 30.

The calculation of the distance, the relative velocity, and the strength of the reflected wave is made every time the radar sensor 20 rotates by 1.2° and thus obtained values are sequentially stored at the memory unit 30.

The processing unit 10 performs peak detection, based on the obtained strength of the reflected wave, for every rotation of 1.2°. The peak detection is a process of determining the direction in which the reflecting object exists and is performed based on observation of the reflected wave at two adjacent angular directions.

Figure 10:
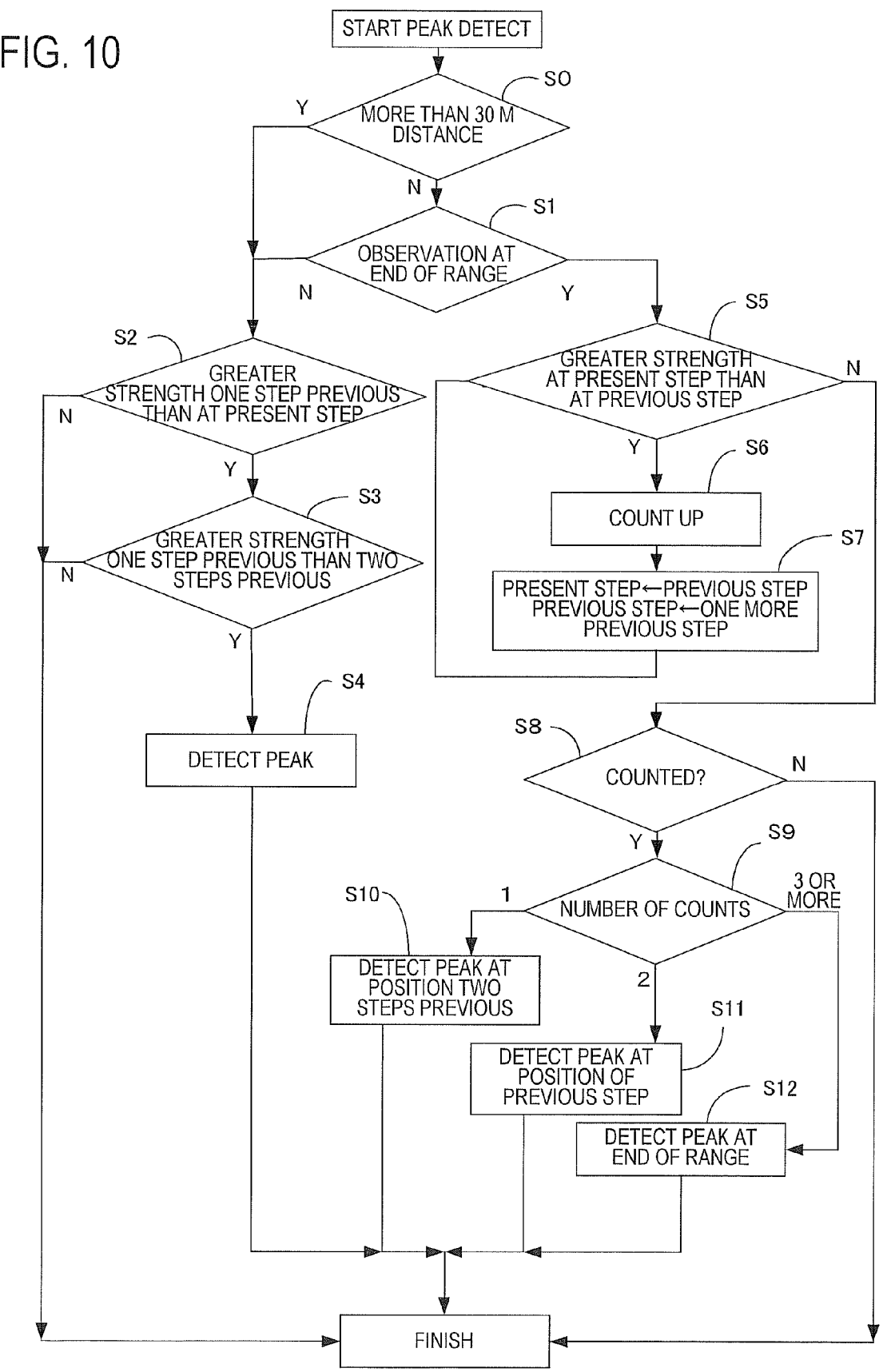
FIG. 10 is a flow chart of peak detection according to the present embodiments.

FIG. 10 is a flow chart of the peak detection according to the present embodiments. When the peak detection starts, confirmation is made of whether the position at which the reflected wave received at the present step was reflected is scores meters away, for example in this case, more than 30 meters away, from the radar apparatus according to the present embodiments (step S0). Since a prompt response is not necessarily required for the object more than 30 meters away, the processing at the end of the detecting range is not applied. Even if at a position more than 30 meters away, a vehicle intrudes into the lane on which other vehicle is running, the response to the intruding vehicle can be made without the processing according to the present invention. When the reflected wave is reflected at the position more than 30 meters away, the process goes to step S2.

When the reflected wave is reflected at a position 30 meters or less away, confirmation is made of whether the present direction of the radar sensor 20 is at the end of the detecting range (step S1). The confirmation of whether the present direction of the radar sensor 20 is at the end of the detecting range can be made by checking whether the angle of the radar sensor 20 is in the vicinity of −9.0° or in the vicinity of +9.6°. When the observation at the end of the detecting range is not the case, step S2 is executed for making ordinary peak detection. On the other hand, when the observation at the end of the detecting range is the case, processing different from the ordinary one is necessary and step S5 is executed.

When the observation at the end of the detecting range is not the case, the strength of the reflected wave in the observation one step previous to the present step is taken out from the memory unit 30 and is compared with the strength of the reflected wave in the observation at the present step (step S2). If the strength of the reflected wave is weaker in the observation one step previous than in the observation at the present step, then the peak can not be detected and the direction of the reflecting object can not be identified. In this case, the peak detection processing is finished.

At step S2, if the strength of the reflected wave is stronger in the observation one step previous than in the observation at the present step, then the strength of the reflected wave in the observation two steps previous to the present step is taken out from the memory unit 30 and is compared with the strength of the reflected wave in the observation one step previous to the present step (step S3). If the strength of the reflected wave is stronger in the observation two steps previous than in the observation one step previous, then the peak can not be detected and the direction of the reflecting object can not be identified. In this case, the peak detection processing is finished.

At step S3, if the strength of the reflected wave is weaker in the observation two steps previous than in the observation one step previous, then it is judged that the peak was observed one step previously (step S4). The direction of the reflecting object is determined to be the direction of the radar sensor 20 one step previous and the processing is finished.

When it is confirmed at step S1 that the observation at the end of the detecting range is the case, the strength of the reflected wave in the observation one step previous to the present step is taken out from the memory unit 30 and is compared with the strength of the reflected wave in the observation at the present step (step S5). If the strength of the reflected wave is stronger in the observation one step previous than in the observation at the present step, then the counter that was set to zero at the start of the peak detection is checked (step S8).

At step S5, if it is judged that the strength of the reflected wave is weaker in the observation one step previous than in the observation at the present step, then one is added to the counter that was set to zero at the start of the peak detection (step S6). After the addition, the comparison of the strength at the present step and the strength at the previous step at step S5 is changed to the comparison of the strength at the previous step and the strength at two steps previous (step S7), and again the comparison of the strength of the reflected wave is made (step S5).

A process of step S5 to step S7 is repeated until detection of the case where the strength of the reflected wave one more step previous is stronger or until the strength of the reflected wave comes below the threshold. When this repetition ends, checking is made at step S8 of how many times the process of step S5 to step S7 was repeated. The number of times of repetition represents how many degrees of angular range the reflecting object observed at the end of the detecting range has. If the number of times of repetition is one time, then it indicates that the reflecting object was observed only in the measurement at the end of the detecting range and that the angular range of 1.2° was observed. If the number of times of repetition is two times, it indicates that the reflecting object was observed only in the measurement at the end of the detecting range and in the angular direction nearest at inner side thereof and that the angular range of 2.4° was observed.

Figure 11:
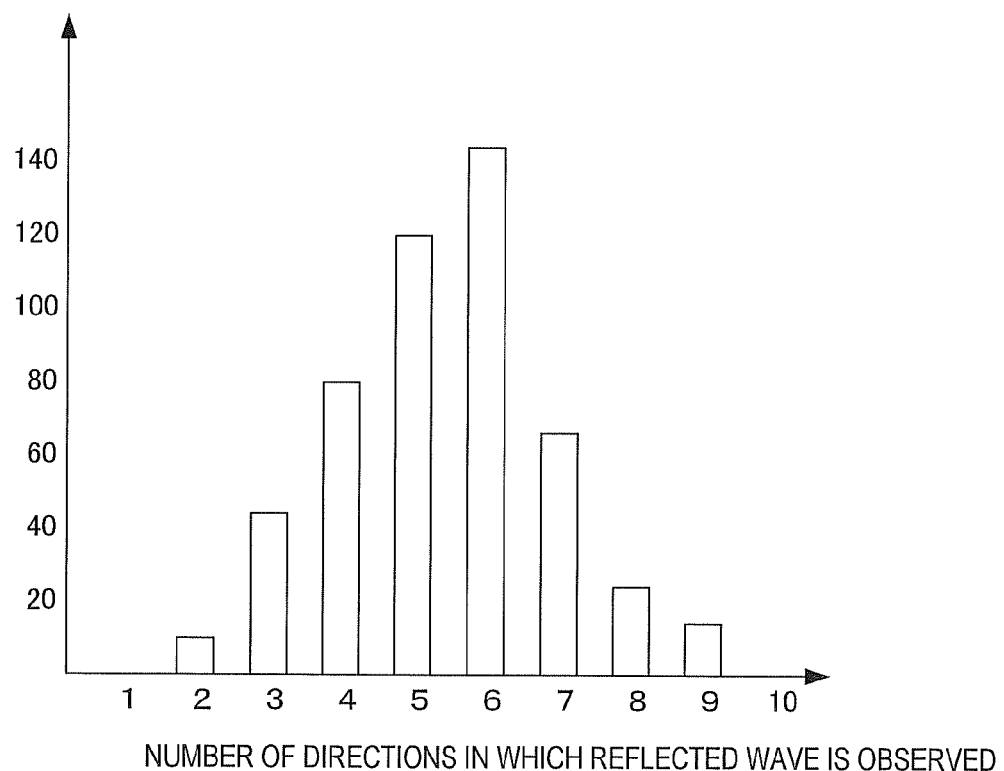
FIG. 11 is a histogram of the number of directions in which the reflected wave was observed when a vehicle running within 30 meters ahead was observed.

FIG. 11 is a histogram of the number of directions in which the reflected wave was observed when a vehicle running within 30 meters ahead was observed. This experiment was to investigate, when a vehicle on which the radar apparatus according to the present embodiments is installed follows another vehicle running ahead, in how many directions within the transmitting range of the transmitted wave the vehicle running ahead is observed within 30 meters distance. In the histogram, the horizontal axis indicates the number of directions of 1.2° each in which the reflected wave from the reflecting object was observed and the vertical axis indicates the number of times of observation. In this experiment, one vehicle was detected in two to nine directions, namely, in 5.4 directions on the average. The reason for the limitation to within 30 meters is that in the present invention, the detection at the end of the radar detecting range must be speedily carried out to respond to the intrusion of the vehicle running a short distance off from the end of the detecting range. It is not necessary to take a speedy action against an approach of the vehicle a long distance off from the end of the detecting range.

The figure "5.4" obtained in the experiment in FIG. 11 can be a yardstick in detecting the vehicle. The vehicle running ahead is detected in about five directions and if the object can be detected only in definitely less than five directions, then the object can be determined not to be the vehicle, and no speedy action is required.

Now description returns to the flow chart of FIG. 10. At step S8, if it is confirmed that a count was not made, then the processing is finished. If the count was made one time or more, then the number of counts is confirmed (step S9).

If the number of counts is "1", this means that the reflecting object was detected only at the end of the detecting range of the radar apparatus. Considering the fact that the vehicle running ahead is detected in about five directions on the average, it can be supposed that the object equivalent to four directions exists outside the detecting range. In this connection it is supposed that the center of the object is in the second direction outside the detecting range, or in the third direction counted from and including the end of the detecting range (step S10).

Figure 12:
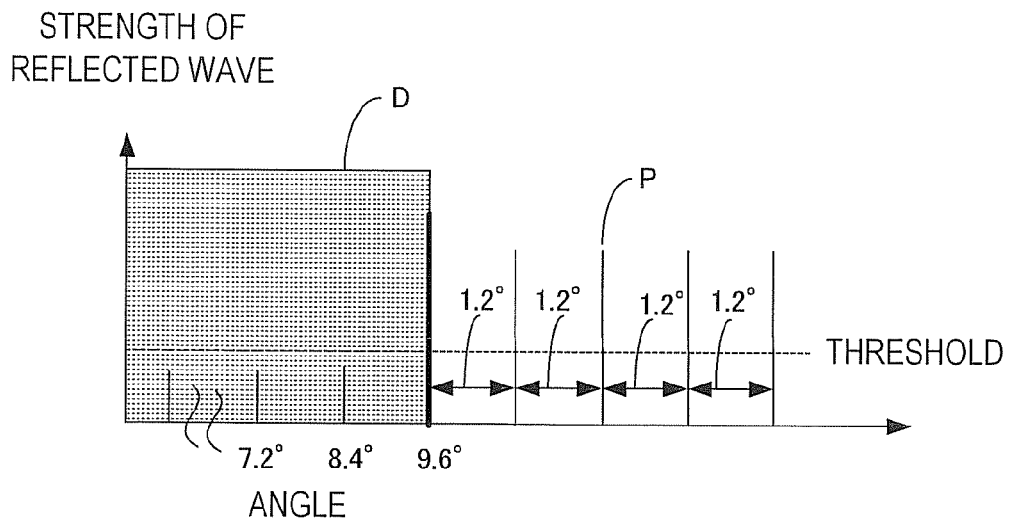
FIG. 12 is a diagram of an example of the strength of the reflected wave and a supposed center of the reflecting object when the number of counts was 1.

FIG. 12 is a diagram of an example of the strength of the reflected wave and a supposed center of the reflecting object when the number of counts was "1". In this diagram, when the front of the vehicle is set at 0°, the direction after rotation of 9.6° to the right is at the end of the detecting range D of the radar apparatus. The number of counts of "1" means that there is no detection of the reflected wave exceeding the threshold in the direction of 8.4°. When it is supposed that the reflected wave is detected at every 1.2° outside the end of the detecting range, since the vehicle running ahead is detected in about five directions, it can be judged that the center P of the reflecting object that caused the reflected wave at 9.6° is in the direction 2.4° to the right from the end of the detecting range.

The number of counts of "2" means that the reflecting object was detected only at the end of the detecting range of the radar apparatus and in the nearest direction at the inner side thereof. Considering the fact that the vehicle running ahead is detected in about five directions on the average, it can be supposed that the object equivalent to three directions exists outside the detecting range. In this connection it is supposed that the center of the object is in the first direction outside the detecting range, or in the second direction counted from and including the end of the detecting range (step S11).

Figure 13:
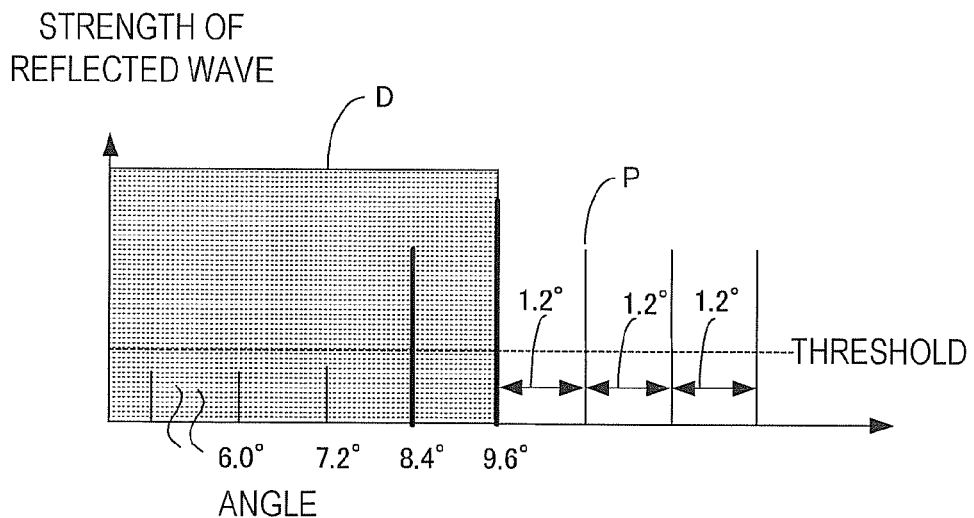
FIG. 13 is a diagram of an example of the strength of the reflected wave and the supposed center of the reflecting object when the number of counts was 2.

FIG. 13 is a diagram of an example of the strength of the reflected wave and a supposed center of the reflecting object when the number of counts was "2". In this diagram, when the front of the vehicle is set at 0°, the direction after rotation of 9.6° to the right is at the end of the detecting range D of the radar apparatus. The number of counts of "2" means that there is no detection of the reflected wave exceeding the threshold in the direction of 7.2° or that the strength of the reflected wave at 7.2° is greater than the strength of the reflected wave at 8.4°. When it is supposed that the reflected wave is detected at every 1.2° outside the end of the detecting range, since the vehicle running ahead is detected in about five directions, it can be judged that the center P of the reflecting object that caused the reflected wave at 9.6° is in the direction 1.2° to the right from the end of the detecting range.

The number of counts of "3" means that the reflecting object was detected only at the end of the detecting range of the radar apparatus and in the two nearest directions at the inner side thereof. Considering the fact that the vehicle running ahead is detected in about five directions on the average, it can be supposed that the object equivalent to two directions exists outside the detecting range. In this connection it is supposed that the center of the object is in the direction of the end of the detecting range (step S12).

Figure 14:
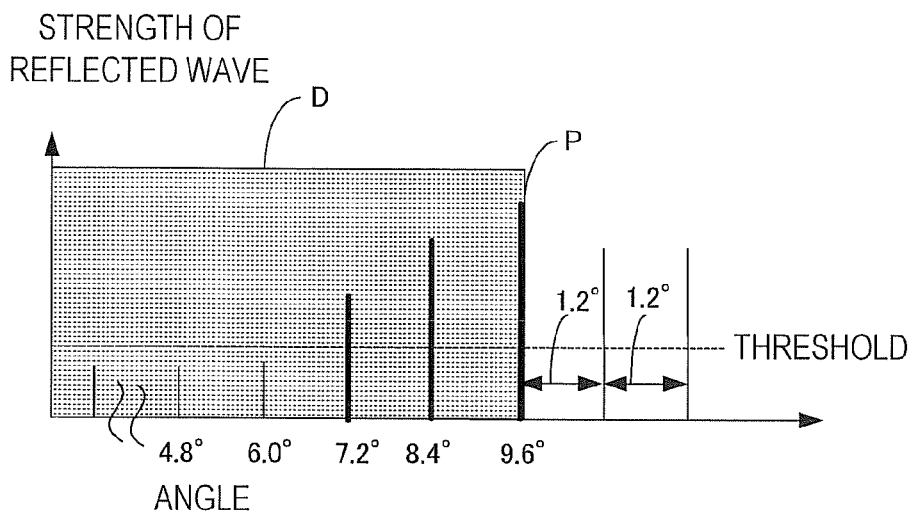
FIG. 14 is a diagram of an example of the strength of the reflected wave and the supposed center of the reflecting object when the number of counts was 3.

FIG. 14 is a diagram of an example of the strength of the reflected wave and a supposed center of the reflecting object when the number of counts was "3". In this diagram, when the front of the vehicle is set at 0°, the direction after rotation of 9.6° to the right is at the end of the detecting range D of the radar apparatus. The number of counts of "3" means that there is no detection of the reflected wave exceeding the threshold in the direction of 6.0° or that the strength of the reflected wave at 6.0° is greater than the strength of the reflected wave at 7.2°. When it is supposed that the reflected wave is detected at every 1.2° outside the end of the detecting range, since the vehicle running ahead is detected in about five directions, it can be judged that the center P of the reflecting object that caused the reflected wave at 9.6° is in the direction of the end of the detecting range.

Figure 15:
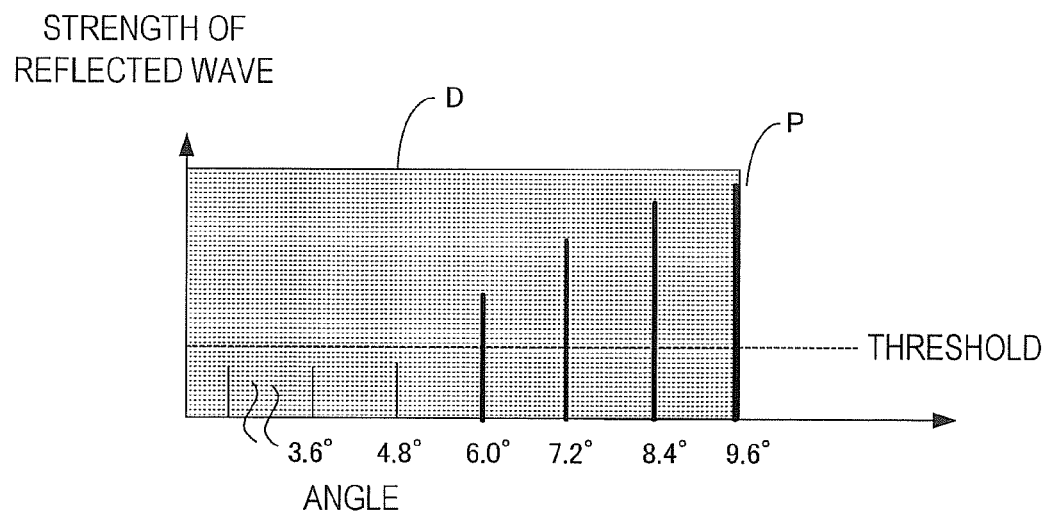
FIG. 15 is a diagram of an example of the strength of the reflected wave and the supposed center of the reflecting object when the number of counts was 4.

FIG. 15 is a diagram of an example of the strength of the reflected wave and a supposed center of the reflecting object when the number of counts was "4". The number of counts of "4" means that there is no detection of the reflected wave exceeding the threshold in the direction of 4.8° or the strength of the reflected wave at 4.8° is greater than the strength of the reflected wave at 6.0° and furthermore, that contrary to the supposition that the vehicle running ahead is detected in about 5 directions on the average, a decline in the strength of the reflected wave is not observed although the reflected wave is detected in four directions. In such a case, it is judged that the center P of the reflecting object that caused the reflected wave is in the direction of the end of the detecting range.

Figure 16:
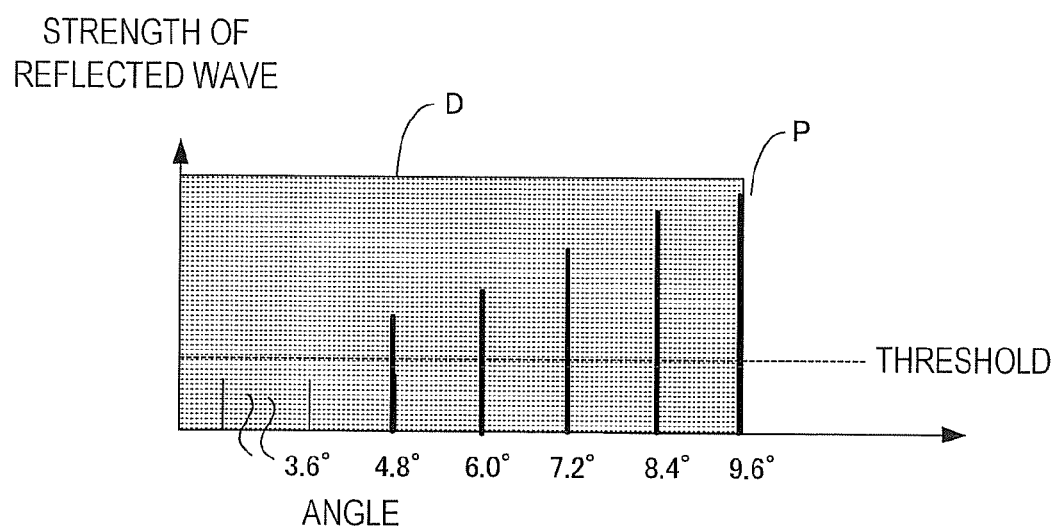
FIG. 16 is a diagram of an example of the strength of the reflected wave and the supposed center of the reflecting object when the number of counts was 5.

FIG. 16 is a diagram of an example of the strength of the reflected wave and a supposed center of the reflecting object when the number of counts was "5". The number of counts of "5" means that there is no detection of the reflected wave exceeding the threshold in the direction of 3.6° or the strength of the reflected wave at 3.6° is greater than the strength of the reflected wave at 4.8° and furthermore, that contrary to the supposition that the vehicle running ahead is detected in about 5 directions on the average, a decline in the strength of the reflected wave is not observed although the reflected wave is detected in five directions. In such a case, it is judged that the center P of the reflecting object that caused the reflected wave is in the direction of the end of the detecting range. Likewise, even when the number of counts is "6" or more, it is judged that the end of the detecting range is at the center of the reflecting object.

As described heretofore, the position of the center of the object is determined depending on the number of counts in steps S10 to S12, and the processing in FIG. 10 is finished.

Turning back to FIG. 7, when the direction of the reflecting object is determined, thus determined direction is output by the processing unit 10 and is provided to the ECU 5. The ECU 5 is provided with various information such as a vehicle speed signal P1, steering angle information P2, and a yaw rate signal P3 by various parts of the vehicle. Based on such information and the determined direction of the object, the ECU 5 transmits a warning signal P5 and a display signal P6 to a panel provided in the vehicle. The panel gives a warning to the driver who is driving the vehicle, using a speaker and a display lamp. The ECU 5 can also weaken the accelerator by way of a throttle signal P4.

Figure 17:
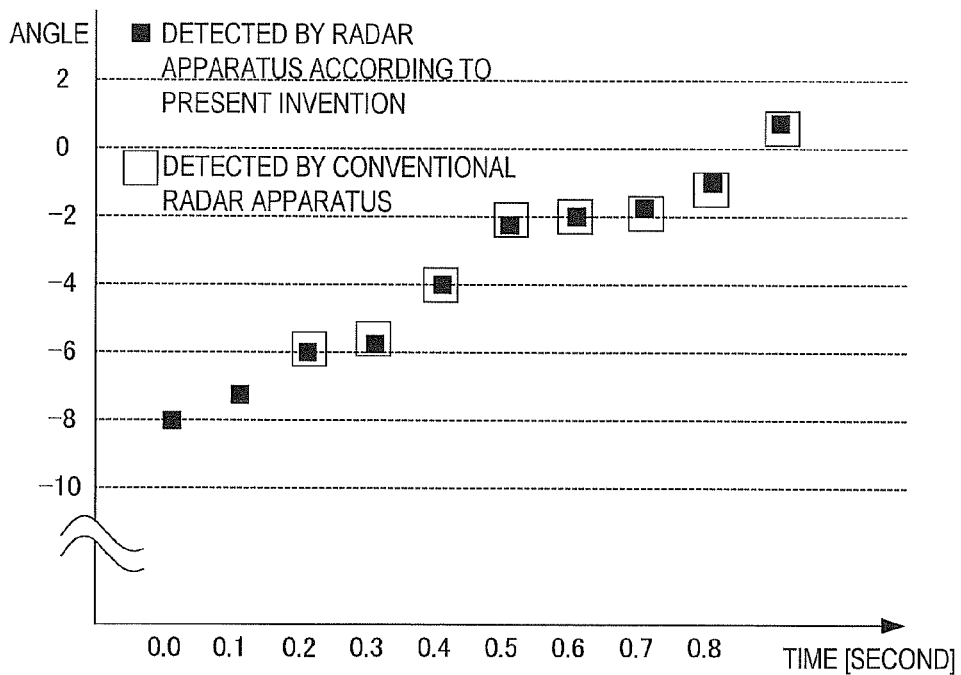
FIG. 17 is a graph of comparison between a conventional radar apparatus and the radar apparatus according to the present embodiments in an experiment of detecting a vehicle intruding from the adjacent lane to the left.

FIG. 17 is a graph of comparison between a conventional radar apparatus and the radar apparatus according to the present embodiments in an experiment of detecting a vehicle intruding from the adjacent lane to the left. In this graph, the vertical axis indicates the angle when the direction of the front of the vehicle is set to 0° and the horizontal axis indicates the time elapsed from the first detection of the intruding vehicle by the radar apparatus according to the present embodiments. The vehicle intruding from the adjacent lane to the left is detected for the first time at around −8.0° by the radar apparatus according to the present embodiments. Thereafter, the intruding vehicle gradually approaches 0°. 0.2 seconds, namely, two cycles, after detection by the radar apparatus according to the present embodiments, the conventional radar apparatus detects the intruding vehicle. Thereafter, the two radar apparatuses continue to detect the intruding vehicle in the same way. In this experiment, the radar apparatus according to the present embodiments could detect the intruding vehicle 0.2 seconds earlier than the conventional radar apparatus could.

Figure 18:
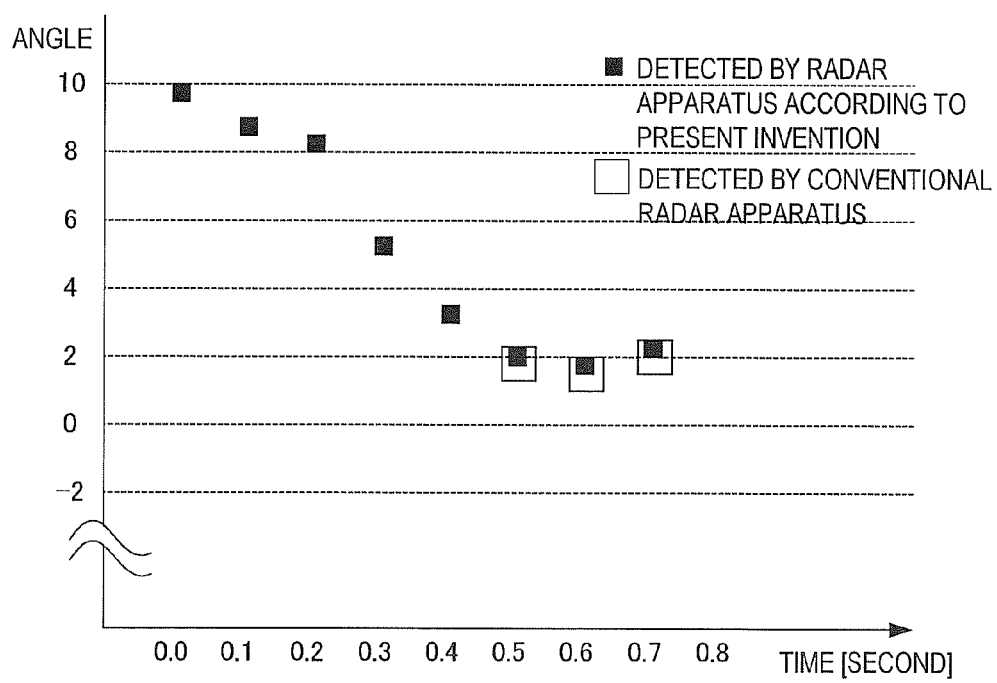
FIG. 18 is a graph of comparison between the conventional radar apparatus and the radar apparatus according to the present embodiments in an experiment of changing the course to the adjacent lane to the right.

FIG. 18 is a graph of comparison between the conventional radar apparatus and the radar apparatus according to the present embodiments in an experiment of changing the course to the adjacent lane to the right. In this graph as well, the vertical axis indicates the angle when the direction of the front of the vehicle is set to 0° and the horizontal axis indicates the time elapsed from the first detection of the intruding vehicle by the radar apparatus according to the present embodiments. The vehicle running on the adjacent lane to the right is detected for the first time at around 10° by the radar apparatus according to the present embodiments. Thereafter, the vehicle running on the adjacent lane to the right gradually approaches 0°. 0.5 seconds, namely, five cycles, after detection by the radar apparatus according to the present embodiments, the conventional radar apparatus detects the vehicle. Thereafter, the two radar apparatuses continue to detect the vehicle in the same way. In this experiment, the radar apparatus according to the present embodiments could detect the vehicle 0.5 seconds earlier than the conventional radar apparatus could.

As set forth hereinabove, the radar apparatus according to the present embodiments enables speedy detection of the object near the end of the detecting range by determining that the object is positioned in the direction of the end of the detecting range when the strength of the reflected wave in the direction of the end of the detecting range is greater than the strength of the reflected wave in the nearest angular direction at the inner side thereof.

What is claimed is:

1. A radar apparatus comprising:
a radar sensor which transmits a transmitted wave by scanning over a predetermined angular range and receives a reflected wave reflected by an object located within the angular range; and
a processing unit which obtains a peak of signal strength from a distribution of signal strength of the received reflected waves over the predetermined angular range and determines the direction of the object within the angular range based on the peak of signal strength, wherein the processing unit is adapted to:
have a reference number of the received reflected waves predetermined based on an average number of the received reflected waves of the object, wherein the average number of the received reflected waves of the object is included in the predetermined angular range, and
process the signal strength over one scan at the end of the scanned angular range,
wherein if the peak in signal strength is not detected and the distribution of strength of the received reflected wave has a tendency of increasing toward the end to the angular range, the processing unit is further adapted to determine that the object is positioned in the direction rotated by an angle corresponding to the reference number of the received reflected waves toward the end of the angular range, based on the angle at which the increasing tendency begins.

2. The radar apparatus of claim 1, wherein
when the number of the received reflected wave is greater than the reference number of the received reflected waves, the processing unit determines that the object is positioned at the end of the angular range.

3. A radar apparatus comprising:

a radar sensor which transmits a transmitted wave by scanning over a predetermined angular range and receives a reflected wave reflected by an object located within the angular range; and a processing unit which obtains a peak of signal strength from a distribution of signal strength of the received reflected waves over the predetermined angular range and determines a direction of the object within the angular range based on the peak of signal strength, and calculates a distance to the object, wherein the processing unit is adapted to;

have a reference number of the received reflected waves, and process the signal strength over one scan at the end of the scanned angular range, wherein if the calculated distance is within a predetermined range, if the peak in signal strength is not detected, and if the distribution of strength of the received reflected wave has a tendency of increasing toward the end to the angular range, the processing unit is further adapted to determine that the object is positioned in the direction rotated by an angle corresponding to the reference number of the receive reflected waves toward the end of the angular range, based on the angle at which the increasing tendency begins, and wherein, if the calculated distance is not within a predetermined range, the processing unit does not determine that the object is positioned in the direction rotated by the angle corresponding to the reference number of the received reflected waves toward the end of the angular range.

4. The radar apparatus of claim 3, wherein when the number of received reflected waves is greater than the reference number of the received reflected waves, the processing unit determines that the object is at the end of the angular range.

5. A radar apparatus comprising:

a radar sensor which transmits a transmitted wave by scanning over a predetermined angular range and receives a reflected wave reflected by an object located within the angular range;

a processing unit which obtains a peak of signal strength from a distribution of signal strength of the received reflected waves over the predetermined angular range and which generates a reference number of the received reflected waves based on an average number of the received reflected waves of the object included in the predetermined angular range; and a memory communicatively coupled to the processing unit, the memory operable to store strengths of reflected waves sequentially obtained by the processing unit at adjacent angular positions, wherein if the processing unit detects the received reflected wave has a tendency of increasing toward the end of the angular range and if the peak is not detected, the processing unit determines whether the object exists in the direction of the end of the angular range, based on comparisons of the stored signal strengths of respective reflected waves for respective angular positions adjacent to the present angular position, and based on the reference number of the received reflected waves toward the end of the angular range.

* * * * *